United States Patent
Lai (10) Patent No.: US 8,220,952 B2
(45) Date of Patent: Jul. 17, 2012

(54) LED LAMP

(75) Inventor: Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 224 days.

(21) Appl. No.: 12/790,859

(22) Filed: May 31, 2010

(65) Prior Publication Data

US 2011/0255273 A1    Oct. 20, 2011

(30) Foreign Application Priority Data

Apr. 19, 2010    (TW) .............................. 99112098 A (51) Int. Cl.
*B60Q 1/00* (2006.01)
*B60Q 1/26* (2006.01)
*F21L 13/00* (2006.01)

(52) U.S. Cl. ... 362/192; 362/183; 362/193; 362/249.02; 362/294; 362/373; 362/431; 362/800

(58) Field of Classification Search .................. 362/183, 362/192–193, 249.02, 294, 373, 431, 800
See application file for complete search history.

(56) References Cited

U.S. PATENT DOCUMENTS 7,789,524 B2 *   9/2010   Anderson ..................... 362/183
7,832,891 B2 * 11/2010   Zhou ............................ 362/192

* cited by examiner

*Primary Examiner* — Jason Moon Han
(74) *Attorney, Agent, or Firm* — Altis Law Group, Inc.

(57) ABSTRACT

An LED lamp includes a lamp post, an illumination unit fixed on the lamp post, and a generator disposed in the lamp post and coupled to the illumination unit electrically. The lamp post defines an airflow passage along a longitudinal direction thereof. The airflow passage communicates with an outer environment. The generator is adapted for converting wind energy to electric energy, and includes a rotary turbine arranged in the airflow passage. The rotary turbine includes a hub and a plurality of blades around the hub. Each of the blades includes a top face and an opposite bottom face. The top face and the bottom face are symmetric to a plane which extends through opposite connecting edges of the top and bottom faces and is perpendicular to a rotary axis of the turbine.

18 Claims, 7 Drawing Sheets

LED LAMP

BACKGROUND

1. Technical Field

The disclosure relates to light emitting diode (LED) lamps for illumination purpose and, more particularly, relates to an LED lamp utilizing wind energy to supply electric energy thereto and improve heat dissipation efficiency thereof.

2. Description of Related Art

In recent years, due to their excellent light quality and high luminous efficiency, light emitting diodes (LEDs) have been increasingly applied to substitute for cold cathode fluorescent lamps (CCFL), incandescent bulbs, compact bulbs and fluorescent tubes as light source of an illumination device.

However, illuminating stability of the LEDs is significantly affected by heat generated thereby. When the temperature of the LEDs is too high, light intensity of the LEDs may gradually attenuate, shortening the lifespan of the illumination devices. Thus, some illumination devices include heat dissipation devices, such as exhaust fans, thermoelectric coolers, etc., to dissipate heat of the LEDs. However, the heat dissipation devices require a great amount of electricity to function, such that application of the heat dissipation devices defeats the purpose of saving energy by using LEDs as light source.

What is needed, therefore, is an improved LED lamp which can overcome the limitations described.

DETAILED DESCRIPTION

Figure 1:
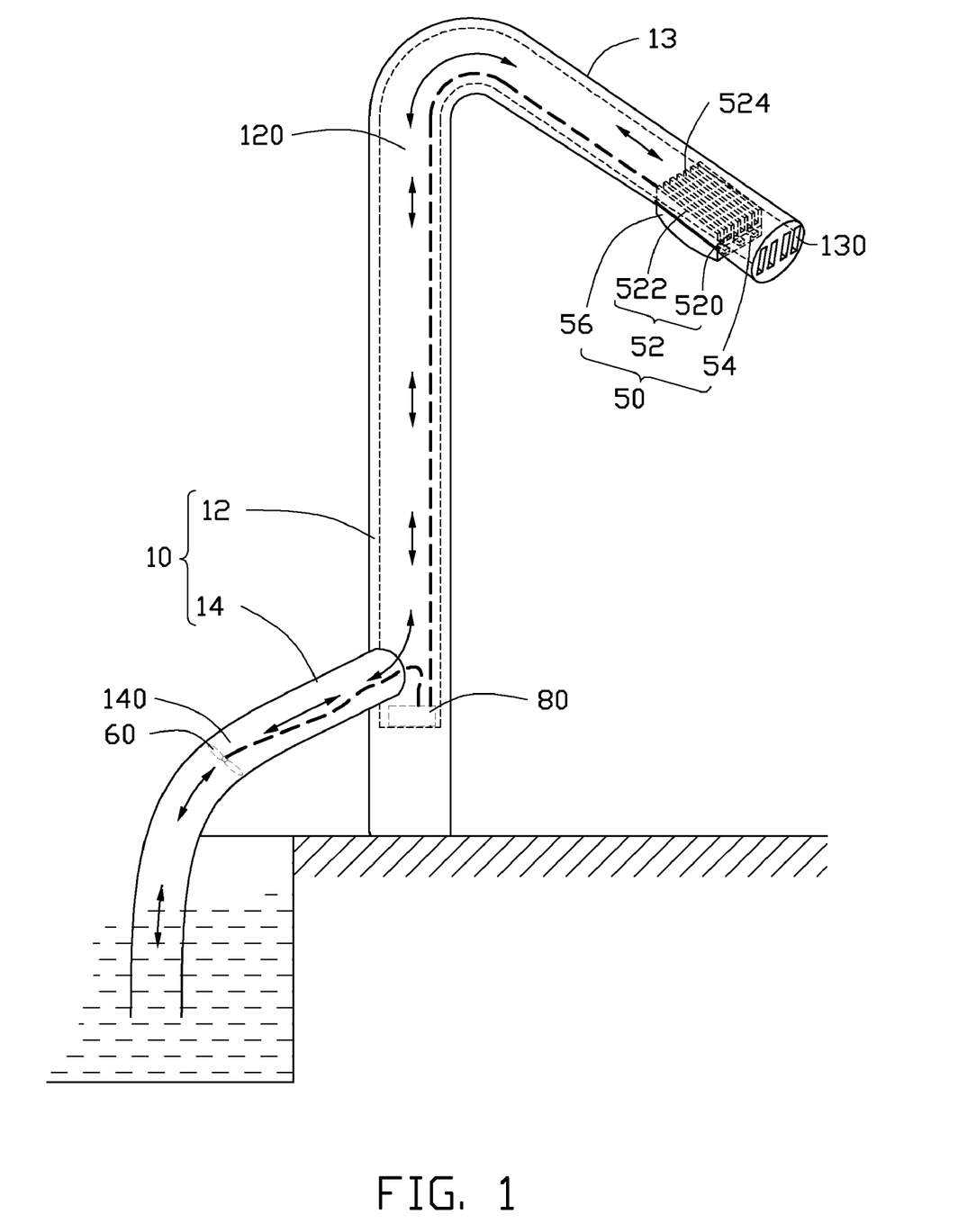
FIG. 1 is a schematic view showing an LED lamp in accordance with a first embodiment of the disclosure in use.

Referring to FIG. 1, an LED lamp according to a first embodiment of the disclosure is shown. The LED lamp includes a lamp post 10, an illumination unit 50, a generator 60 and a rechargeable battery 80.

The lamp post 10 includes a main post 12 and a branch post 14 joined to the main post 12. The main post 12 is tubular and elongated. A bottom portion of the main post 12 is firmly installed on the ground. A top portion 13 of the main post 12 bends towards the ground. A first airflow tunnel 120 is defined in the main post 12 and extends along a longitudinal direction of the main post 12. A plurality of through holes 130 are defined at an outer end of the top portion 13 of the main post 12, communicating the first airflow tunnel 120 with an outer environment.

The branch post 14 extends outwardly from the bottom portion of the main post 12, and is tubular. A second airflow tunnel 140 is defined in the branch post 14 and extends along a longitudinal direction of the branch post 14. The branch post 14 is open at two opposite ends thereof. One end of the branch post 14 connects to the main post 12 with the second airflow tunnel 140 communicating with the first airflow tunnel 120. Thus the first airflow tunnel 120 and the second airflow tunnel 140 cooperatively form an airflow passage inside the lamp post 10. The airflow passage communicates the outer environment at two opposite ends thereof.

The illumination unit 50 is arranged on the top portion 13 of the main post 12, and is adjacent to the through holes 130. The illumination unit 50 includes a heat sink 52, a plurality of LEDs 54 attached to the heat sink 52 and thermally connecting therewith, and an envelope 56.

The heat sink 52 is made of metal with good heat conductivity, such as aluminum, copper or an alloy thereof. The heat sink 52 is disposed in the top portion 13 of the main post 12 and located on the first airflow tunnel 120. The heat sink 52 includes a base 520 and a plurality of fins 522 extending upwardly from the base 520. The fins 522 are spaced from and parallel to each other. An airflow channel 524 is formed between every two adjacent fins 522. Each airflow channel 524 extends along a direction as the first airflow tunnel 120 extends.

The LEDs 54 are placed opposite to the fins 522 and face downwardly towards the ground. In this embodiment, the LEDs 54 are evenly arranged on the base 520. The envelope 56 is hermetically connected to a periphery of the base 520 and cooperates with the base 520 to enclose the LEDs 54 therein for increasing the sealing performance of the LED lamp, thereby protecting the LEDs 54 from contamination and moisture. Furthermore, the envelope 56 can function as a lens to modulate the light generated by the LEDs 54 to have a desired pattern.

The generator 60 is disposed in the branch post 14. The rechargeable battery 80 is disposed in the main post 12 and is adjacent to the branch post 14. The rechargeable battery 80 is arranged between the generator 60 and the illumination unit 50, and is electrically connected to the generator 60 and the LEDs 54 of the illumination unit 50 by wires. Alternatively, the LEDs 54 can be connected to the generator 60 directly to get electric energy therefrom. Preferably, in this embodiment, the generator 60 is a wind generator. The generator 60 includes a rotary turbine 62. When the turbine 62 is forced to rotate under an action of an airflow, the generator 60 is driven to convert wind energy to electric energy; the rechargeable battery 80 thus stores/reserves the electric energy generated by the generator 60 therein. Therefore, electric energy can also be applied to the LEDs 54 to cause the LEDs 54 to illuminate even when there is no wind available to drive the generator 60 to generate electricity.

Figure 2:
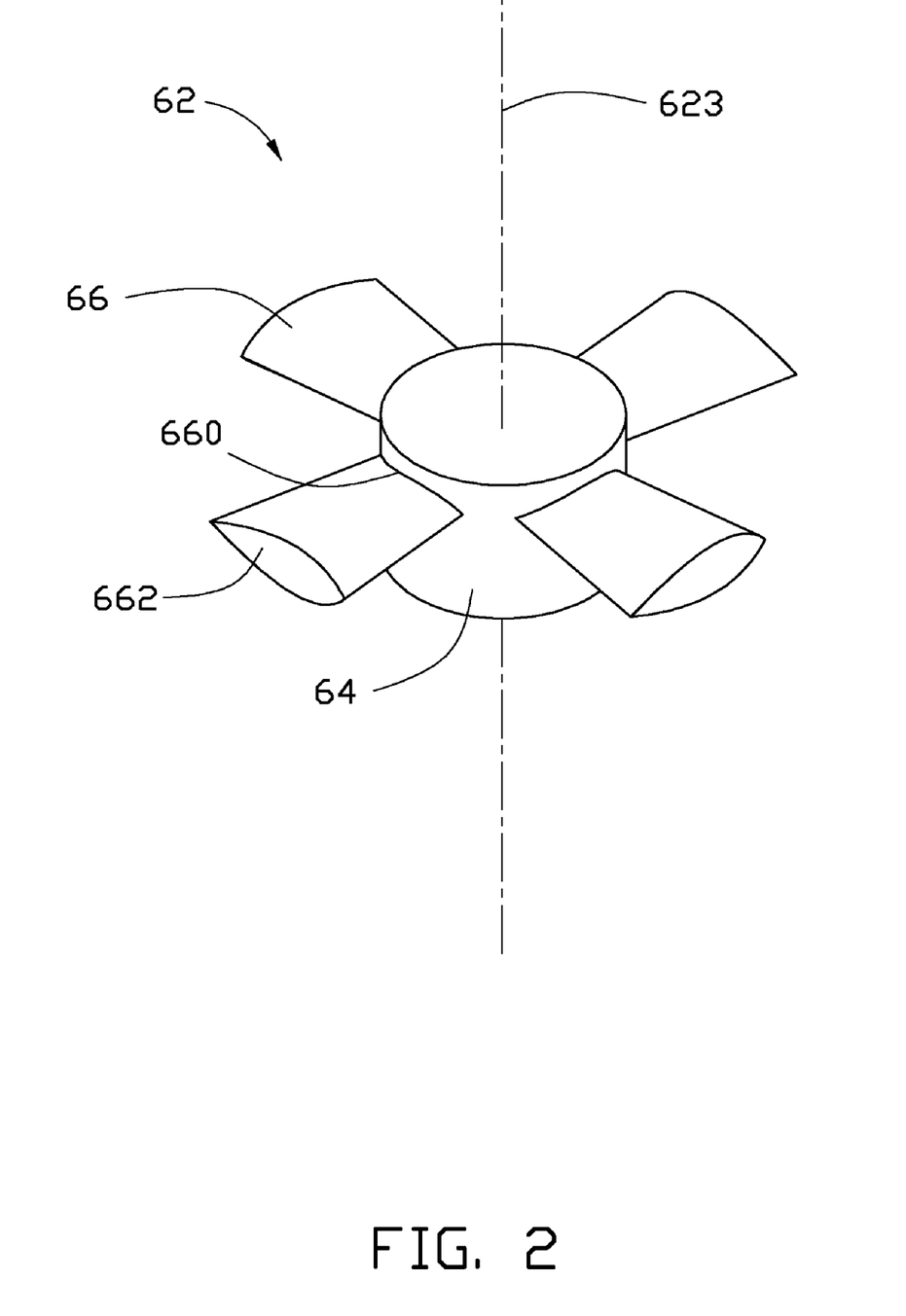
FIG. 2 is an isometric view of a turbine of the LED lamp of FIG. 1.
Figure 3:
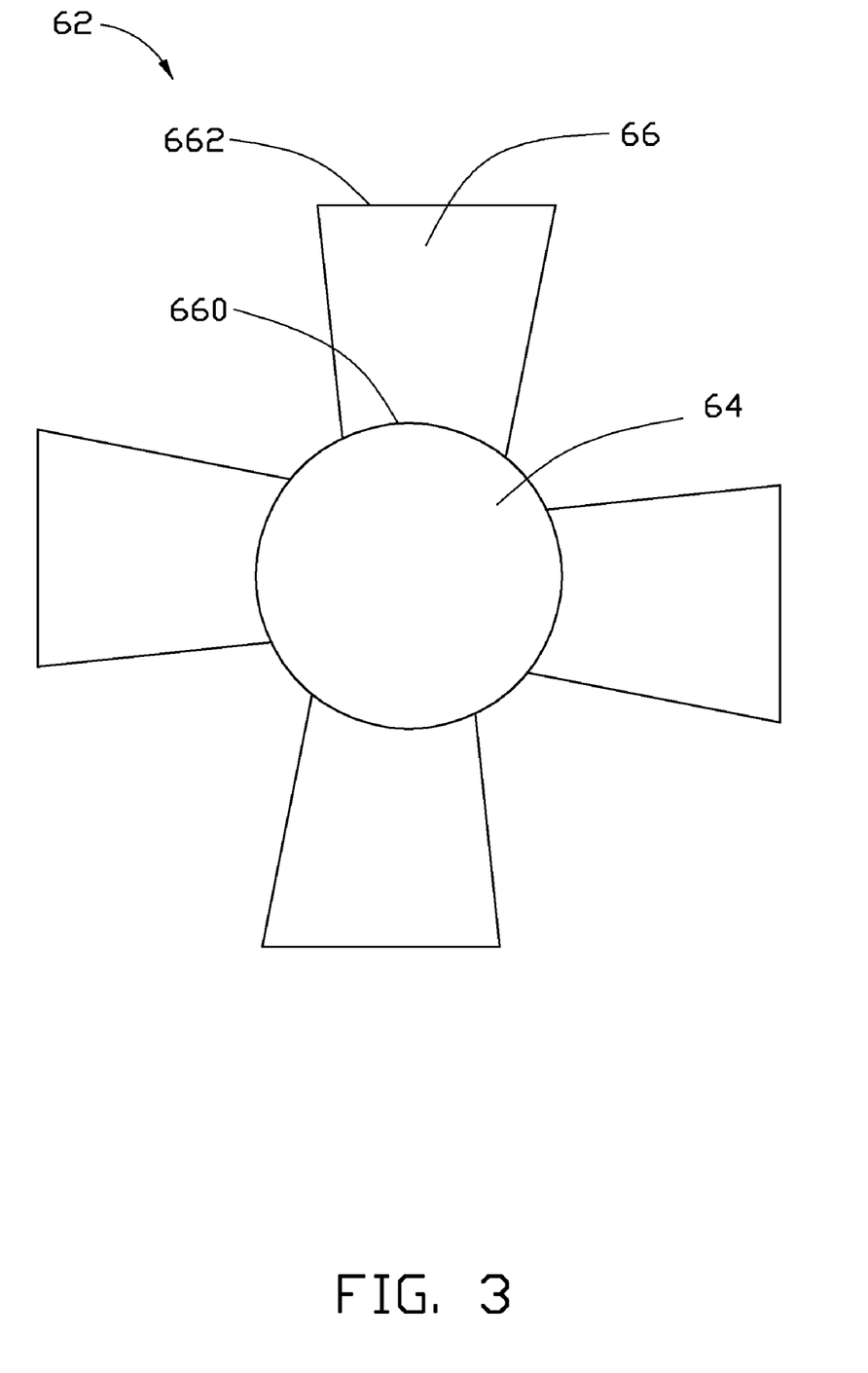
FIG. 3 is a top plane view of the turbine of FIG. 2.
Figure 4:
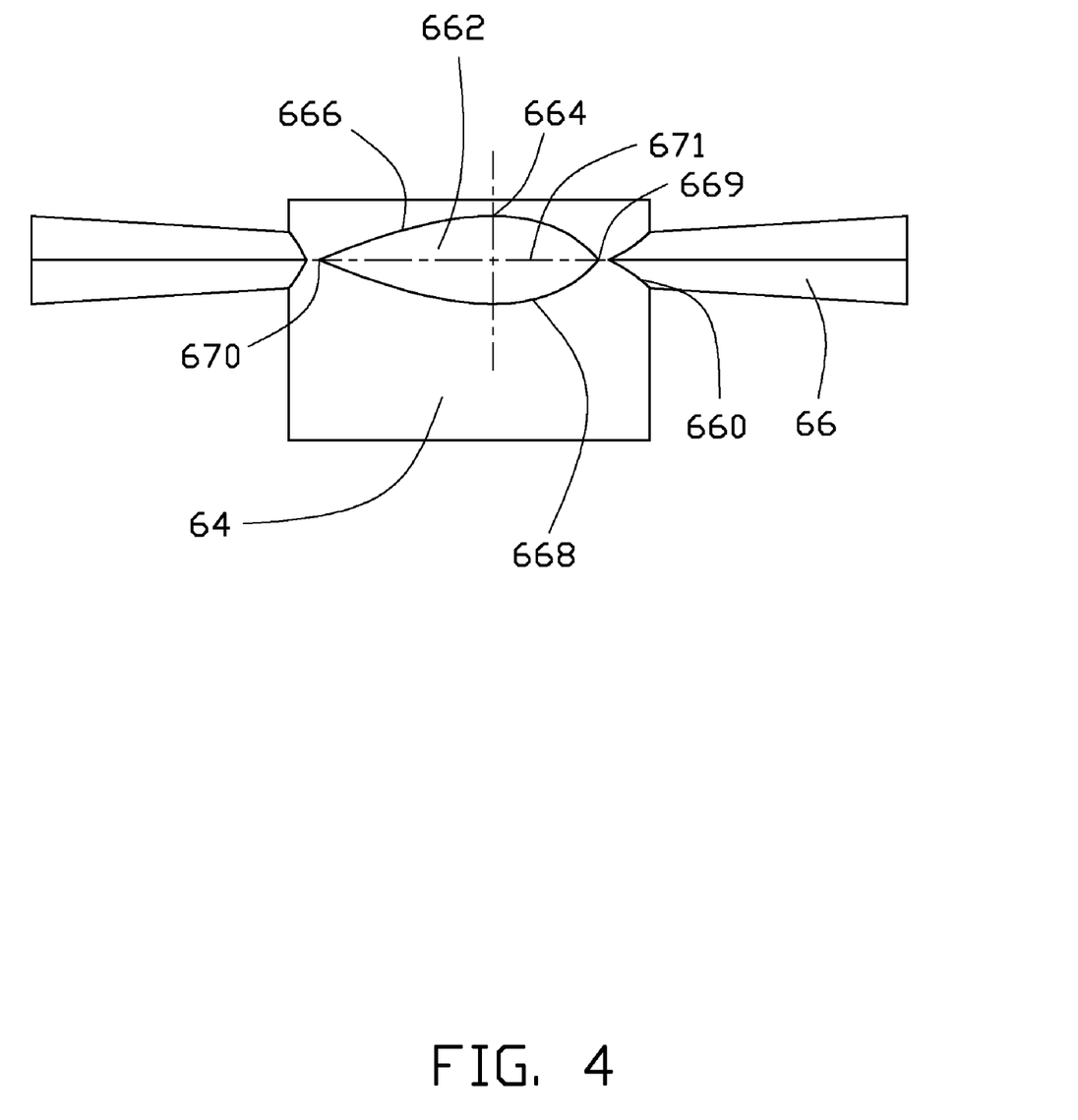
FIG. 4 is a front view of the turbine of FIG. 2.

Referring to FIG. 2, the turbine 62 includes a hub 64 and a plurality of blades 66 extending outwards from the hub 64. Referring to FIGS. 3 and 4 at the same time, the blades 66 are evenly distributed along a circumferential direction of the hub 64. Each blade 66 perpendicularly intersects with the hub 64. An inner end 660 of the blade 66 connected to the hub 64 and an outer end 662 of the blade 66 away from the hub 64 cooperatively define a plane which is perpendicular to a central axis 623 of the turbine 62, i.e., a rotation axis of the turbine 62. In this embodiment, each blade 66 is generally an annulus sector. A width of the blade 66 increases from the inner end 660 to the outer end 662 gradually.

Each blade 66 includes a top face 666 and an opposite bottom face 668. Both the top face 666 and the bottom face 668 of the blade 66 are convex. Particularly referring to FIG. 4, the top and bottom faces 666, 668 meet each other at a front (right) edge 669 and a rear (left) edge 670. The bottom face 668 and the top face 666 are symmetric to a plane 671 through the front and rear edges 669, 670. The plane 671 is perpendicular to the central axis 623 of the turbine 62. As measured along the width direction of the blade 66, a distance between the top face 666 and the bottom face 668, i.e., a thickness of the blade 66, increases inwardly from the opposite edges 669, 670 of the blade 66. Preferably, a position 664 with the maximum thickness of the blade 66 is offset from a middle of the blade 66 along the width direction thereof, wherein the middle is equidistant from the front and rear edges 669, 670. An area of a narrower portion of the top face 666 at one lateral side of the position 664 with the maximum thickness, i.e., a portion of the top face 666 excluding the middle of the blade 66 along the width direction, is smaller than that of a wider portion of the top face 666 at the other lateral side of the position 664. Similarly, an area of a narrower portion of the bottom face 668 at one lateral side of the position 664 is smaller than a wider portion of the bottom face 668 at the other side of the position 664.

Figure 5:
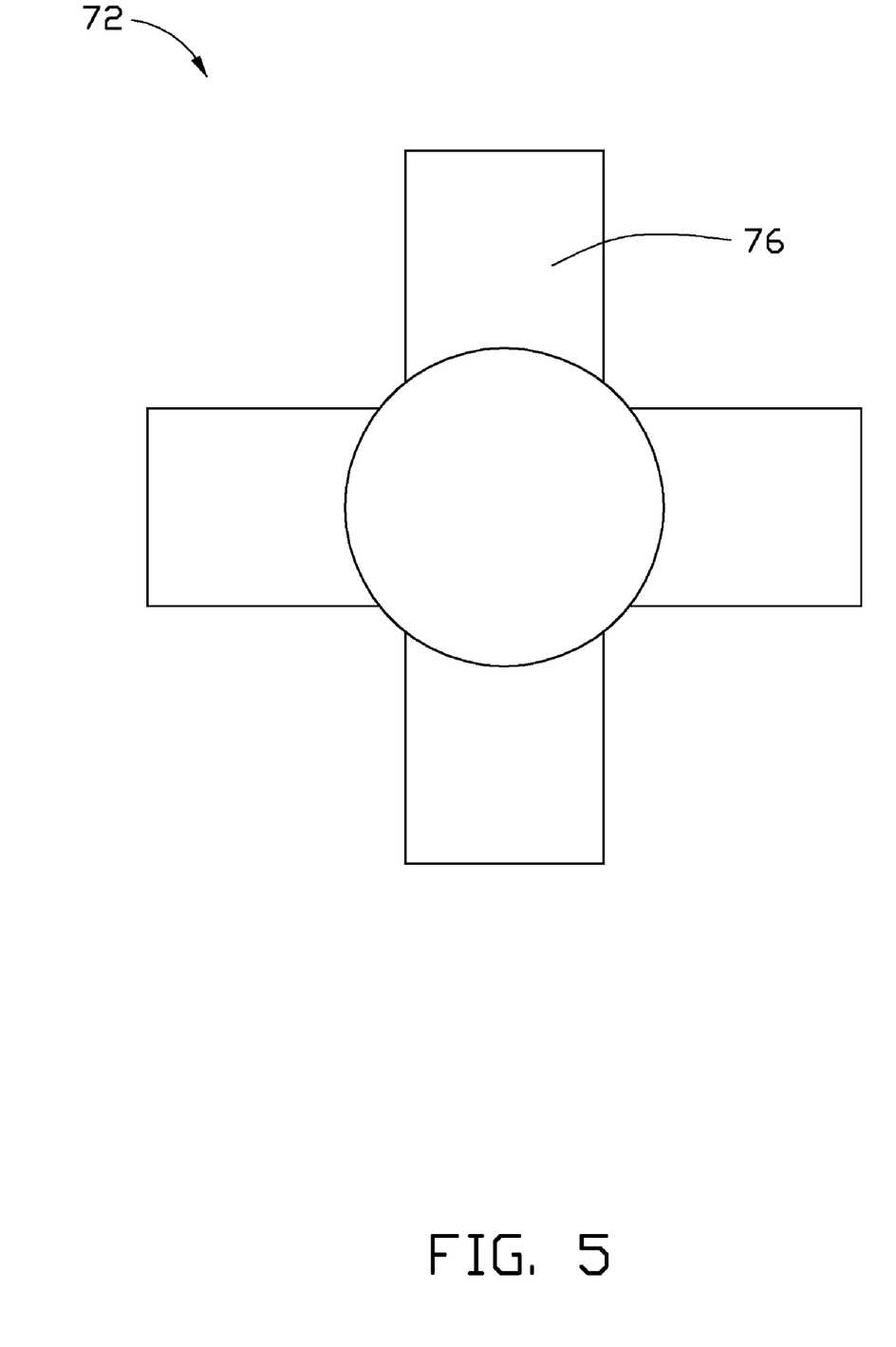
FIG. 5 is similar to FIG. 3, but shows a turbine according to an alternative embodiment.

FIG. 5 shows a turbine 72 according to an alternative embodiment. Difference from the turbine 62 shown in FIGS. 2-4 is: the blades 76 of the turbine 72 each are generally rectangular. Alternatively, the shape, the size and the number of the blades 76(66) can be varied according to need.

Referring to FIG. 1 again, in use, the LED lamp can be installed at an embankment adjacent to a natural water source, such as sea, river or lake, with the other end of the branch post 14 away from the main post 12 extending into the natural water, thereby wave of the sea, river or lake would make air in the lamp post 10 flow upwardly and downwardly in turn. More specifically, when the water moves upwardly, the airflow flows upwardly along the airflow passage and then to the outer environment through the through holes 130 of the top portion 13 of the main post 12. Alternatively, when the water moves downwardly, the airflow flows into the lamp post 10 via the through holes 130 and then flows downwardly along the airflow passage. In addition, the LED lamp can be installed at an open land with the other end of the branch post 14 away from the main post 12 being open, so that the natural airflow can be guided into the lamp post 10 to cause the air in the lamp post 10 to form an airflow.

When the airflow in the lamp post 10 moves upwards, the airflow impinges on the top faces 666 of the blades 66. Conversely, when the airflow in the lamp post 10 moves downwards, the airflow impinges on the bottom faces 668 of the blades 66. Since the top faces 666/bottom faces 668 are unsymmetrical along the width direction thereof (i.e., relative to the position 644), the forces of the airflow on the narrow portion and the wider portion of each of the top faces 666/bottom faces 668 are different from each other, thereby causing the turbine 62 of the generator 60 to rotate. Accordingly, electric energy is produced by the generator 60 to enable the LEDs 54 of the illumination unit 50 to illuminate. Since the top face 666 and the bottom face 668 of each of the blades 66 are symmetric to each other relative to the plane 671, the rotation direction of the turbine 62 is constant even if the flowing direction of the airflow in the lamp post 10 changes frequently, thereby improving an energy converting efficiency of the generator 60.

When the LEDs 54 are activated by the electric energy, heat is also generated. The heat of the LEDs 54 is absorbed by the base 520 of the heat sink 52 and then transferred to the fins 522. The airflow in the lamp post 10 can also take away the heat from the fins 522. Further, rotation of the turbine 62 can accelerate the airflow in the lamp post 10, which enhances heat exchanging efficiency between the fins 522 and the airflow. Accordingly, the heat of the LEDs 54 can be taken away timely, and thus the LEDs 54 can be maintained to work at a lower temperature.

Figure 6:
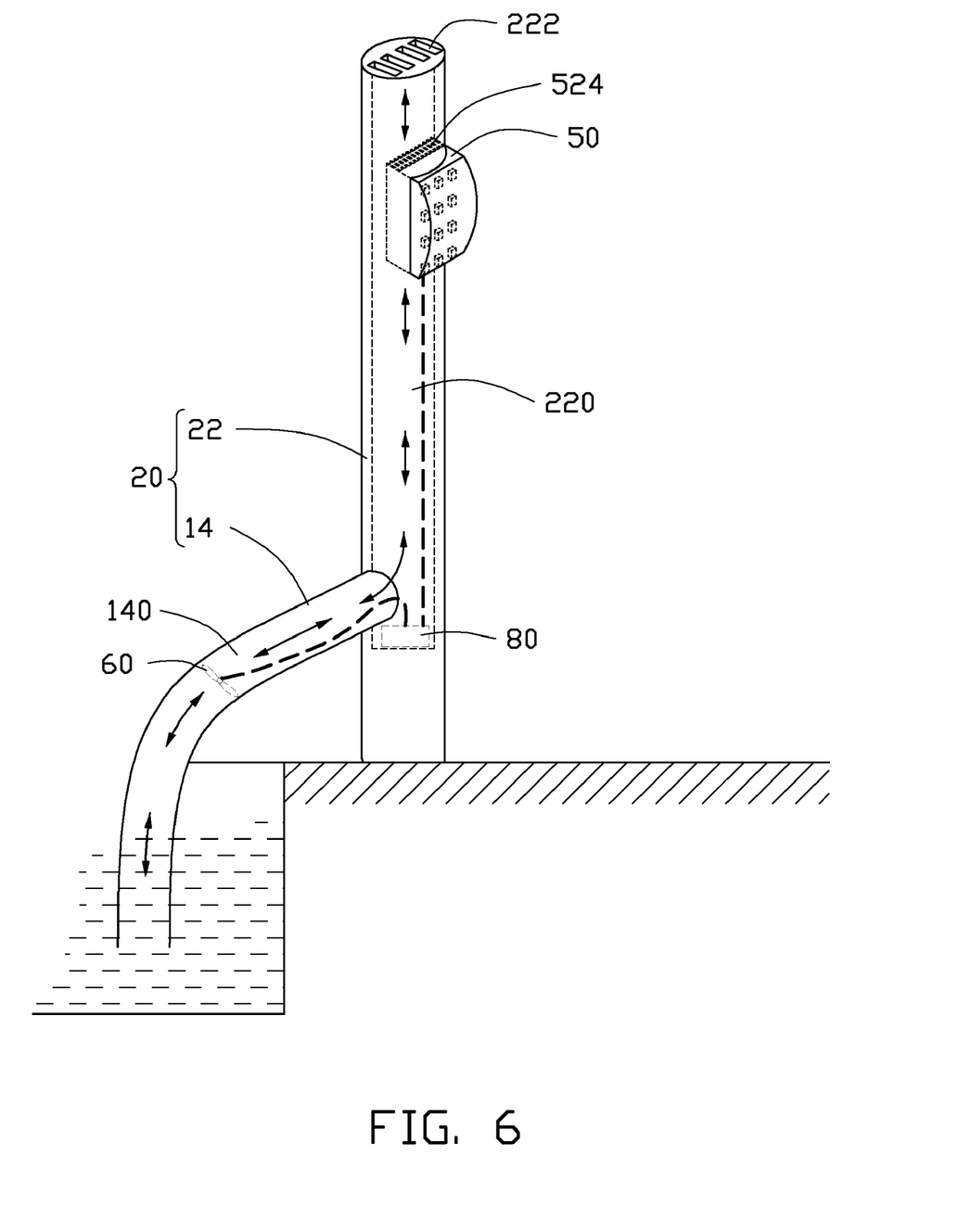
FIG. 6 is a schematic view showing an LED lamp according to a second embodiment of the disclosure in use.

FIG. 6 shows an LED lamp according to a second embodiment of this disclosure, differing from the first embodiment only in the main post 22 of the lamp post 20. In this embodiment, the main post 22 is straight and tubular. A straight first airflow tunnel 220 is defined in the main post 22, and a plurality of through holes 222 are defined in a top end surface of the main post 22 to communicate the first airflow tunnel 220 with the outer environment. The illumination unit 50 is fixed on a circumferential side of the main post 22 and adjacent to the top end of the main post 22. Similar to the first embodiment, the branch post 14 of the lamp post 20 is connected to the bottom portion of the main post 22 with the second airflow tunnel 140 thereof communicating with the first airflow tunnel 220, thereby the first airflow tunnel 220 combined with the second airflow tunnel 140 forming the airflow passage inside the lamp post 20, for air flowing therethrough.

Figure 7:
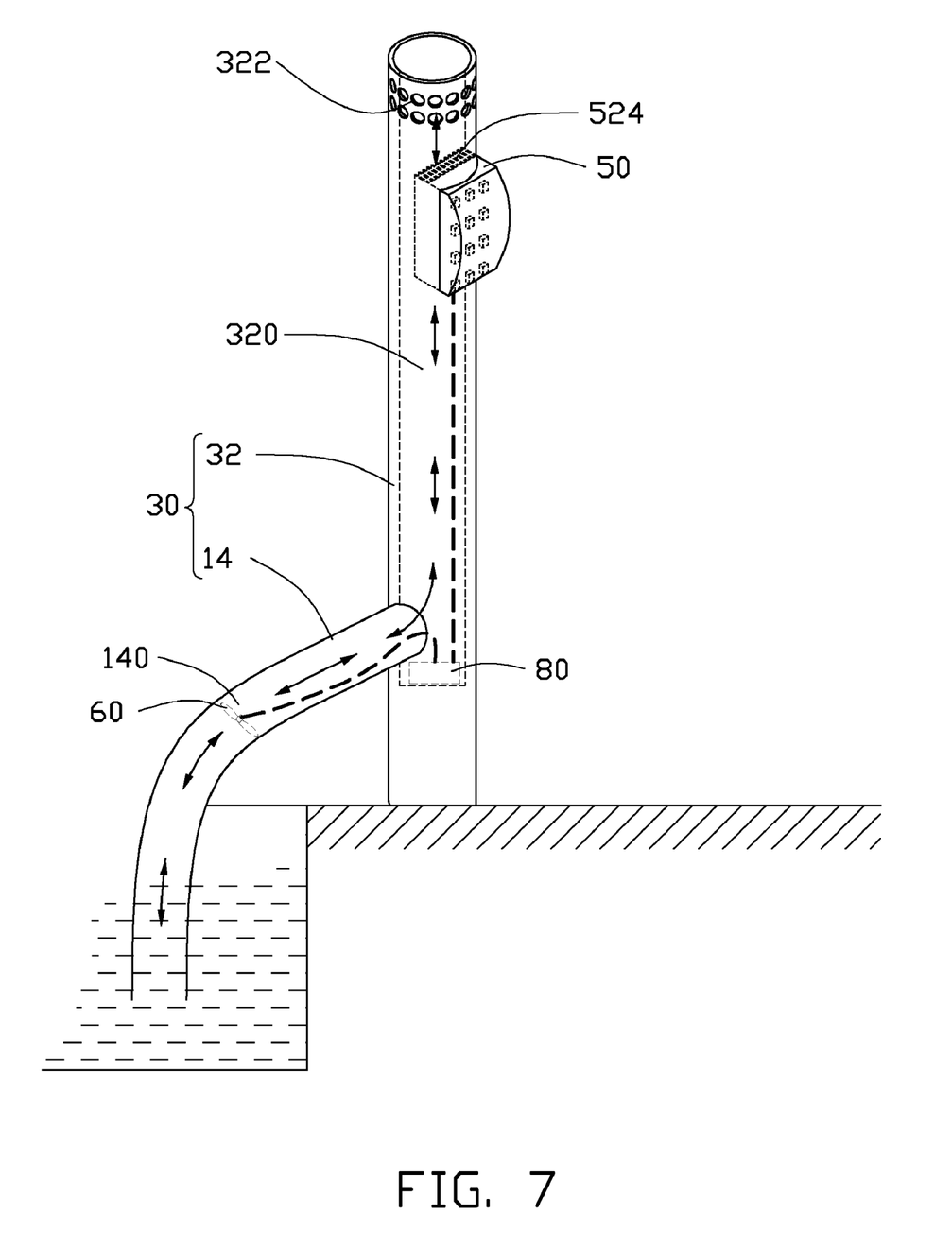
FIG. 7 is a schematic view showing an LED lamp in accordance with a third embodiment of the disclosure in use.

Referring to FIG. 7, an LED lamp of a third embodiment of this disclosure is illustrated. The difference between this LED lamp and the LED lamp of the second embodiment is the through holes 322 of the main post 32 of the lamp post 30. In this embodiment, the through holes 322 are defined in the circumferential side of the main post 32 adjacent to the top end of the main post 32, so as to avoid rain waters flowing into the lamp post 30. The illumination unit 50 is fixed on the main post 12 and below the through holes 130. Similar to the previous embodiments, a first airflow tunnel 320 is defined in the main post 32, and a second airflow tunnel 140 is define in the branch post 14 communicating with the first airflow tunnel 320. The first airflow tunnel 320 combined with the second airflow tunnel 140 forms the airflow passage inside the lamp post 30, for air flowing therethrough.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED lamp comprising:
a lamp post inserted into a natural water source and defining an airflow passage along a longitudinal direction thereof, the airflow passage communicating with an outer environment;
a generator disposed in the lamp post to convert wind energy to electric energy, the generator comprising a rotary turbine arranged in the airflow passage, the rotary turbine comprising a hub and a plurality of blades around the hub, each of the blades comprising a top face and an opposite bottom face, the top face and the bottom face being symmetric to a plane which extends through connecting points of the top and bottom faces; and
an illumination unit fixed on the lamp post and coupled to the generator electrically.

2. The LED lamp of claim 1, wherein the plane is perpendicular to a rotary axis of the turbine.

3. The LED lamp of claim 1, wherein each of the blades extends perpendicularly outwards from the hub, the top face and the bottom face of the blade being convex.

4. The LED lamp of claim 3, wherein a thickness of the blade increases inwardly gradually from two opposite lateral sides of the blade in the width direction of the blade, and a position with the maximum thickness of the blade is offset from a middle of the blade along the width direction thereof, the connecting points of the top and bottom faces being at the opposite lateral sides of the blade, respectively, the middle being equidistant from the connecting points.

5. The LED lamp of claim 4, wherein areas of the top face of the blade at opposite sides of the position with the maximum thickness of the blade are different from each other.

6. The LED lamp of claim 5, wherein the area of a portion of the top face at one side of the position with the maximum thickness of the blade including the middle of the blade along the width direction is larger than that of the other portion of the top face.

7. The LED lamp of claim 4, wherein areas of the bottom face of the blade at opposite sides of the position with the maximum thickness of the blade are different from each other.

8. The LED lamp of claim 7, wherein the area of a portion of the bottom face at one side of the position with the maximum thickness of the blade including the middle of the blade along the width direction is larger than that of the other portion of the bottom face.

9. The LED lamp of claim 1, further comprising a rechargeable battery coupled to the generator and the illumination unit.

10. The LED lamp of claim 1, wherein the illumination unit comprises a heat sink and a plurality of LEDs attached to the heat sink, the heat sink comprising a plurality of fins arranged in the airflow passage of the lamp post.

11. The LED lamp of claim 1, wherein the lamp post comprises a main post adapted for fixing the LED lamp to the ground and a branch post extending from a bottom portion of the main post, the airflow passage comprising a first airflow tunnel defined in the main post and a second airflow tunnel defined in the branch post, a plurality of through holes being defined in a top portion of the main post to communicate the airflow passage to the outer environment, the illumination unit being fixed on the main post and near the through holes.

12. The LED lamp of claim 11, wherein an end of the branch post away from the main post is open, and is inserted into the natural water source selected from sea, river, and lake when the LED lamp is in use.

13. An LED lamp, comprising:
a main post adapted for fixing the LED lamp on the ground, a first tunnel being defined in the main post, and a plurality of through holes being defined in a top portion of the main post to communicate with an outer environment;
a branch post comprising a first end joint to the main post and an opposite open second end that is inserted into a natural water source, a second tunnel being defined in the branch post and communicating with the first tunnel, the open second end communicating the second tunnel with the outer environment;
an illumination unit fixed on the top portion of the main post;
a generator coupled to the illumination unit electrically, the generator comprising a rotary turbine arranged in the second tunnel, the rotary turbine comprising a hub and a plurality of blades around the hub, each of the blades comprising a first face and an opposite second face, the first face and the second face being symmetric to a plane which extends through opposite connecting edges of the first and second faces.

14. The LED lamp of claim 13, wherein the plane is perpendicular to a rotary axis of the turbine.

15. The LED lamp of claim 13, wherein each of the blades extends perpendicularly outwards from the hub, the first face and the second face of the blade being convex.

16. The LED lamp of claim 15, wherein a thickness of the blade increases inwardly gradually from the two opposite connecting edges of the first and second faces of the blade in the width direction of the blade, and a position with the maximum thickness of the blade is offset from a middle of the blade along the width direction thereof, which is equidistant from the opposite connecting edges of the first and second faces.

17. The LED lamp of claim 16, wherein areas of the first face of the blade at opposite sides of the position with the maximum thickness of the blade are different from each other, and areas of the second face of the blade at opposite sides of the position with the maximum thickness of the blade are different from each other.

18. The LED lamp of claim 13, further comprising a rechargeable battery electrically coupled to the generator and the illumination unit.

* * * * *